UNITED STATES PATENT OFFICE.

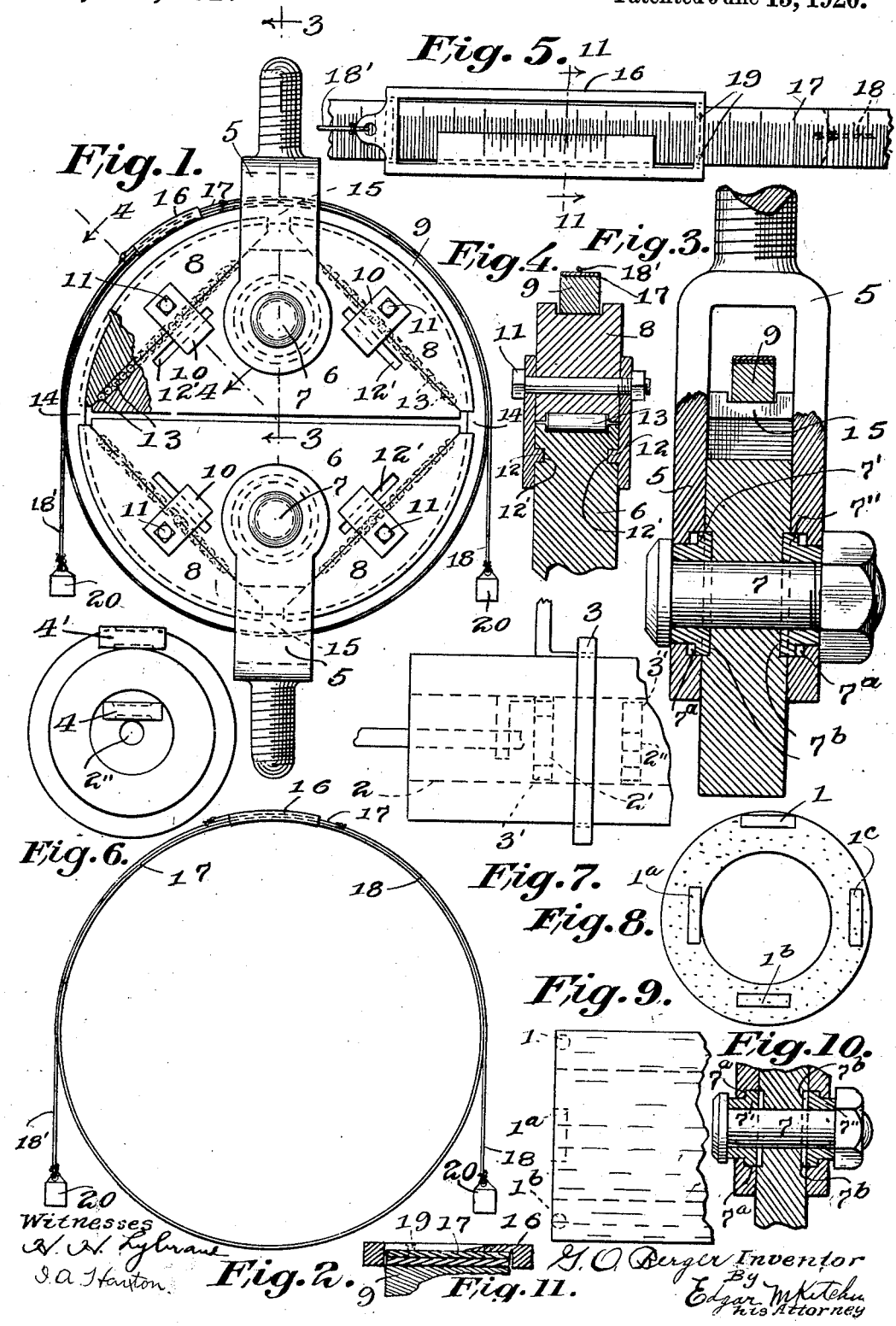

GEORGE O. BERGER, OF PHILADELPHIA, PENNSYLVANIA.

TESTING APPARATUS.

1,343,611.     Specification of Letters Patent.     Patented June 15, 1920.

Application filed September 30, 1916. Serial No. 123,092.

*To all whom it may concern:*

Be it known that I, GEORGE O. BERGER, a citizen of the United States, residing at Philadelphia, in the county of Philadelphia and State of Pennsylvania, have invented certain new and useful Improvements in Testing Apparatus; and I do hereby declare the following to be a full, clear, and exact description of the invention, such as will enable others skilled in the art to which it appertains to make and use the same.

This invention relates to testing mechanism for determining in an efficient and extremely precise manner the condition of steel and other analogous metals prior to their commercial use.

An object in view is to provide a simple and efficient device for expanding metal and obtaining during the course of expansion at all stages thereof an accurate reading of said expansion.

A still further object is to provide an attachment which can be secured to any of the present testing machines used in determining the ductility and tensile strength of any material.

With these and further objects in view, the invention comprises certain novel constructions, combinations and arrangements of parts as subsequently specified and claimed.

In the accompanying drawing,—

Figure 1 is a view in side elevation of a device embodying the several features of my invention, parts being broken away to disclose interior structure.

Fig. 2 is a similar view of the flexible scale and vernier attachment detached.

Fig. 3 is a section taken approximately on the plane indicated by line 3—3 of Fig. 1, parts being seen in elevation.

Fig. 4 is a longitudinal, vertical section taken on the plane indicated by line 4—4 of Fig. 1.

Fig. 5 is a fragmentary plan view of the flexible scale with the vernier caliper attached thereto.

Figs. 6 and 7 are illustrative views of different methods for obtaining material to be tested.

Figs. 8 and 9 are illustrative views in end and side elevation, respectively, showing the location and condition of impurities in the test bars.

Fig. 10 is a fragmentary vertical section taken on the plane indicated by line 3—3 of Fig. 1, parts being seen in elevation.

Fig. 11 is a transverse vertical section taken on the plane indicated by line 11—11 of Fig. 5.

While proportions and materials other than those hereinafter named may be employed efficiently, a clear, accurate and complete statement of the invention will be facilitated by reference to such specific sizes and proportions as are commonly utilized in practice.

Referring to the drawing by numerals, 1 indicates a bar about five inches long which in common practice is removed from the mass of steel to be tested and turned to a certain prescribed size, and then subjected to the testing stresses to the point of breakage.

A bar cut from a cylinder can never represent the conditions of every section in the circumference of the cylinder.

By the bar methods now in use it is impossible to cut a representative test bar out in the bore of a forging intermediate of its ends. If a test bar is desired in the bore intermediate of the ends, sufficient test metal would be necessary to make the test bar the proper length, requiring the bore to be undesirably reduced, as indicated at 2″ in Fig. 6. This would be objectionable, because it would prevent water from passing freely through the forging when the same is being quenched in water during treatment, it being essential for testing purposes that the forgings be treated before any test bars are removed. Bore 2″ being too small for practical purposes, no test is actually made in practice of the metal at this point, and Fig. 6 is in this respect only illustrative of what would have to be done if such a test were made. To obtain test metal from the outside of the forging likewise requires the removal of a ring containing sufficient metal to obtain a bar of a size large enough for testing purposes, as indicated at 4′ in Fig. 6. These bars are just as liable to miss the segregated impurities as to include them, and the bar test is here just as defective as when applied at the ends of the forging.

The impurities in metal usually appear in approximately globular form in the casting, but on forging the metal the impurities are elongated in the general direction of the line of forging. It is customary practice to test the forging by taking test bars 1, 1ª, 1ᵇ and 1ᶜ from the forging, as shown in Fig. 8. The impurities existing in the metal, as seen in Fig. 8, appear rounded, being the end view of the elongated impurities shown in Fig. 9. Fig. 9 illustrates the condition of the said impurities after elongation of the metal by the forging process, the impurities being elongated in conjunction with the metal. It is a known fact that when these impurities appear in a test bar, the bar will invariably fail, and if no impurities occur in any particular bar, the bar will pass a successful test. While it is apparent that the test bars cannot cover all areas of the forging, and therefore such bars may be entirely free from impurities or other defects and may pass the test, yet defects and impurities may at the same time exist in parts of the forging not included in the test bar. However, there being no means, up to the time of the present invention, to ascertain the existence of such impurities and defects as may exist outside of the test bars, it is the present practice to assume that the entire forging is perfect if the test bars pass the test. In use, the entire area of the finished product is subject to strains, notwithstanding impurities missed by the faulty tests effected by the test bar method, and, (despite the margin of safety always calculated) the final products of the tested forging do not always afford that service to be expected of perfect forgings. Because of these difficulties, though the bar test is still practically the only test now known or used, it has been proposed to make a ring test. In making the bar test, the bars, such as 1, 1ᵃ, 1ᵇ and 1ᶜ, are secured by cutting these bars from the ends of the forging. The amount of area of the forging necessarily missed by such bars is clearly indicated in Fig. 8. The proposed method of testing the complete ring has not heretofore met with success or approval, because no adequate apparatus has been produced for carrying out such test. Such apparatus, to be effective, must provide both for uniformity of stresses on the ring and for accurate measurement of the results of such stresses at all times.

The present invention accomplishes these results in an effective and satisfactory manner.

Knowing that all steel forgings or castings contain impurities which are points of weakness in the steel that are liable not to appear in any particular bar, such as bar 1, my present invention is intended to test the steel, particularly gun forgings, locomotive tires and other such material, the test to be similar to such strains and stresses to which the metal is subjected in its actual use.

By the ring test the extent of impurities in a forging, if dangerous, can be more readily detected. The ring will contain all impurities in the plane from which it has been removed, allowing no chance of escape, and making patent the weakest section.

In Fig. 7, rings 3 and 3' represent metal removed from the outer and inner diameters of the forging for testing purposes. These rings when tested would be representative of the condition of the metal in the same plane of the test bars 4 and 4', and include areas of metal necessarily not included in the bars. It can be readily seen that much less test metal is required for a ring taken from the same plane as the outer portion of the test bar than is in the area of a cylinder on the same plane as the test bars, and much less metal accordingly is left in the forging for test purposes when the forging is being turned. This smaller quantity of metal left in the bore does not materially restrict the bore, and does not appreciably interfere with the passage of water during treatment. This is graphically shown by the dotted line bore 2, seen in Fig. 7, and test ring 3' whose bore 2' is obviously sufficiently large to be operative, as contrasted with the undesirably large ring 3'' having an impractically restricted bore 2''.

By testing the entire ring, any dangerous impurities in a forging can be more readily detected than when only a test bar is taken from one point or another in the circumference of the forging. A series of rings taken from one end of the forging to the other will be more representative of the forging than the said test bars.

To effectively test a ring, I provide stress distributing and measuring apparatus, as seen in Figs. 1 to 5, inclusive. Of this apparatus, numeral 5 indicates a fork or other means for affording connection to any of the ordinary testing machines. There are two forks 5, and the arms of each are pivoted to a triangular wedge 6 by bolt 7. The bolt 7 is supplemented by locking bushings 7' and 7'', adapted to rotate within recesses 7ᵃ and 7ᵇ formed in fork 5 and wedge 6 respectively, for withstanding the stresses applied, preventing any possible shearing of bolt 7.

When the bushings 7' and 7'' are in the position shown in Fig. 3, the bolt 7, by means of its respective head and nut, securely clamps fork 5 and the bushings. The bushings when secured are held in locking engagement with wedge 6 counterbored to receive the same. By withdrawing bolt 7 the bushings may be released from locking engagement with wedge 6, and positioned in recesses 7ᵃ of the fork 5 for allowing disengagement of the fork as indicated in Fig. 10 of the drawing. Placing the bushings in the position shown in Fig. 10 allows the fork 5 to easily slide over the wedge 6 for removal. A plurality of the wedges 6 are disposed to act in opposite directions, and each engages a pair of relatively movable segments 8 fixed, by bolts 11, to the wedges 6. Segments 8 are retained in their lateral relation to the wedges 6 by clamps 10 or other securing means, and slidingly engage the wedges. The sides of the clamps 10 are formed with tongues 12 which slidingly engage grooves 12' in wedges 6. For tough testing, the wedges may be disposed in relation to the segments as to bring their meeting edges respectively into frictional contact with each other, but anti-friction bearings 13 are preferably arranged between said meeting edges for delivering maximum expanding pressure with minimum resistance. To prevent the apex of each wedge 6 from contacting with the ring being tested, the wedges are truncated. Each wedge is approximately a right-angle triangle with segment-engaging edges disposed at approximately ninety degrees. This construction being the preferred form is by no means the only manner of obtaining this result, as the wedges 6 could be otherwise shaped and perform the same function. Segments 8 are formed on the inner edges to contact with wedges 6, and on the outside to conform to the inner diameter of the ring 9, or other annulus, such as a locomotive tire or a ring cut from a gun forging.

In operation, when tension is applied to the forks 5, the wedges 6 tend to expand in a radial direction the segments 8, causing a pressure which expands ring 9, and during the process of expansion the ring 9 is kept approximately round by the action of segments 8, which are so formed as to cause this desirable effect. The tension of the fork 5 will be directly exerted on the ring and particularly expressed at the points indicated at 14, 14, all other portions of the ring having slightly less tension, the point of greatest variation being ninety degrees from the points indicated by 14, 14; that is at the points 15, 15 of the ring. The variation is partially governed by the friction caused by the contacting bearings of the parts 6 and 8. As tension is applied to forks 5, the wedges tend to expand the ring in a uniform manner until the elastic limit is reached, at which point, when an additional load is applied, there will be a larger expansion, the strain resulting causing a permanent set.

In order to observe the expansion of the ring I have found that the best results may be obtained by the use of Vernier's caliper 16, (as shown in Fig. 5 of the drawing) in connection with a flexible scale 17, although this result may be obtained in a less accurate manner by the position of the graduated lines on one portion of the flexible scale in relation to the graduated lines of the same scale at its overlapped portion. Attached to this scale at one end is a cord or cable 18, and at its opposite end the scale is secured to the vernier 16 by means of rivets 19. The vernier 16 is milled on its under side to compensate for the thickness of the scale, thus bringing the scale even with the bottom of the vernier, this construction allowing the flexible scale and vernier attachment to lie snugly against the ring to be tested. To the opposite end of the vernier is fastened the cable 18'. At the other extremity of the cables 18 and 18' are attached weights 20. This flexible scale with vernier attachment is placed in a position about the ring to record the expansion of the ring as the load is applied. Continuous observation throughout the test may be obtained by this attachment, and readings should be taken at frequent intervals according to the particular test and results desired.

The weights 20, 20, attached to the scale 17, are just sufficient to keep the scale taut on the ring and allow adjustment with the same tension throughout the test. The load stresses are applied to wedges 6 uniformly and cause a uniform expansion which can be read from the flexible scale as it moves relative to graduations on the vernier. The graduations of the flexible scale and vernier are such with respect to each other as to enable readings as fine as one-thousandth part of an inch in respect to the circumference of the ring being tested.

During testing, the ring will expand gradually until it reaches the elastic limit, and this expanding action will appear by the gradual movement of the graduations of the flexible scale relative to those of the vernier. When the ring reaches the limit of elasticity, the metal begins to flow and the rate of expanding movement will suddenly be greatly increased which will be at once detected by the sudden relative movement of the graduations of the flexible scale relative to the vernier.

When the elastic limit of the ring is reached, if all parts of the ring are free from defects, the ring at points 14, 14 will appreciably decrease in diameter and increase in length as the metal begins to flow at these points.

During the course of testing, on approaching the limit of tensile strength of the ring there will be observed a neck or contracted area at the section or sections of possible rupture. By releasing the strain on the ring and using micrometer calipers, the section reduced most in cross sectional area may be found. The ultimate strength at this weakest section of the ring should then be obtained by releasing wedges 6 and sliding the ring angularly about segments 8 until this weakest section is positioned at the points 14, 14, and again placing the ring under tension, as above stated. On applying tension until the ultimate limit of strength is reached, the expansion of the ring can be noted by the vernier scale attachment, and when the beam of the testing machine drops the expansion can be accurately read and noted. It may be observed that between the time the beam of the testing machine drops and the rupture of the ring, there intervenes an interim of from ten to twenty seconds in which to obtain a reading of the vernier. There is a further expansion after the beam has dropped and until the ring is broken, this expansion and the expansion from the elastic limit to the drop of the beam, are valuable assets in the ductility of steel, which can be minutely recorded by my device, but which cannot be checked in previously known methods of testing.

By using the flexible scale with vernier attachment, the total expansion of the ring can be measured just previous to rupture, and also after the ring is broken by joining the broken sections.

What I claim is:—

1. In an apparatus of the character described, oppositely disposed wedges, means for retaining said wedges in their opposed positions, a plurality of segments secured to the wedges for engagement with a metal band, and means for delivering stresses to the wedges tending to separate them.

2. In an apparatus of the character described, opposed wedges, means for retaining said wedges in their opposed positions, segments adapted to be spread by the wedges, and means slidably engaging the wedges for connecting said wedges to the segments.

3. In testing apparatus, opposed wedges, means for connecting said wedges to a commercial testing machine, and a plurality of segments engaged by said wedges, and means of connection between the wedges and segments for allowing movement of the wedges with respect to the segments.

4. In testing apparatus, a plurality of testing segments, wedges frictionally engaging said segments, and means for retaining said parts in frictional engagement while permitting movement of the wedges with respect to the segments.

5. In testing apparatus, opposed wedges, means for connecting said wedges to a commercial testing machine, a plurality of segments engaged by said wedges, and antifriction means disposed between the wedges and segments for facilitating movement of the wedges with respect to the segments.

6. In testing apparatus, a plurality of substantially triangular wedges, a plurality of segments engaging said wedges, and a plurality of forks each having its arms secured to one of said wedges and its shank formed with threads for attachment to a testing machine.

7. In testing apparatus, a plurality of wedges, segments engaging the wedges in position for being shifted by wedging action of the wedges, anti-friction bearings interposed between the wedging faces of the wedges and the engaged segments, and means for stressing the wedges.

8. In testing apparatus, a plurality of substantially triangular wedges, a plurality of segments engaging said wedges and having anti-friction bearings disposed therebetween, each segment being formed with an edge groove retaining the bearings, and means for stressing the wedges.

9. In testing apparatus, a plurality of wedges, segments engaged and adapted to be wedged thereby, and a fork for each of the wedges engaging its respective wedge at one end portion and having its opposite end portion formed with means for attachment to a testing machine.

10. In testing apparatus, oppositely disposed wedges, segments engaged by said wedges, rings connecting the wedges and segments, the segments being grooved for receiving the rings, and means retaining said wedges in their opposed position.

11. In testing apparatus, oppositely disposed wedges, segments engaged by the wedges, means for retaining said wedges in their opposed position, and means for preventing shearing of parts of the retaining means.

12. In testing apparatus, oppositely acting wedges, grooved segments engaged by the wedges, and means of connection for the segments and wedges, said connecting means engaging the grooves of the segments.

13. In testing apparatus, a plurality of oppositely acting wedges and segments engaged by the wedges, and means for stressing the wedges for effecting their opposed action, the wedges being formed with recesses, and the retaining means being formed with recesses, the wedges and retaining means being adapted to retain other means for preventing shearing of parts of the retaining means.

14. In testing apparatus, stressing wedges, segments engaged by the wedges, and retain-means for the same, the retaining means and wedges being formed with corresponding recesses, and a plurality of bushings positioned within said recesses for connecting the wedges to the retaining means.

15. In testing apparatus, the combination of means for stressing a ring circumferentially, a graduated flexible scale adapted to surround the stressed ring, a vernier caliper attached to the scale, having graduations corresponding with the scale for accurately indicating the circumferential expansion of the ring, and weights pendent from the ends of the scale for tensioning the scale.

16. In an apparatus of the character described, diametrically opposed wedges, means coöperating with the wedges to engage a metal ring or band, whereby the wedges are held in opposed relation, and means for placing the wedges under stress for testing the ductility of a ring surrounding the wedges.

In testimony whereof I affix my signature in presence of two witnesses.

GEORGE O. BERGER.

Witnesses:
 REUBEN W. SEIBERT,
 WARREN W. CLARK.